Oct. 20, 1931.  E. H. ELLISON  1,827,884
METHOD FOR FASTENING ARTICLES TOGETHER
Filed Dec. 18, 1929
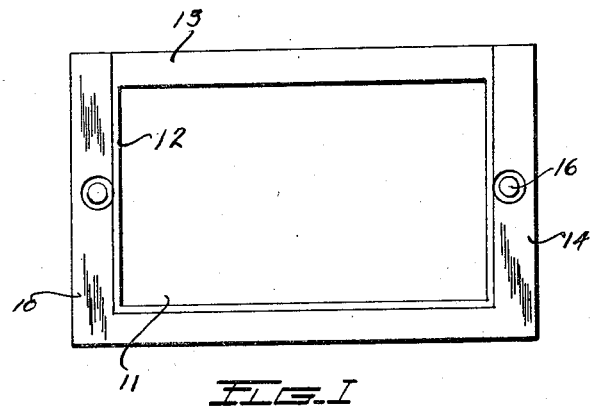
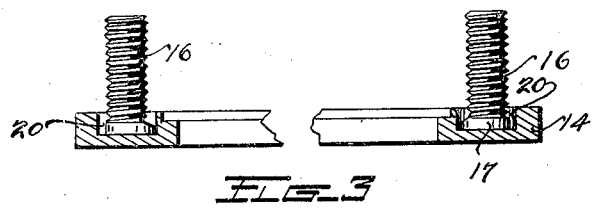
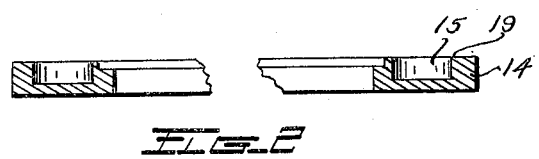
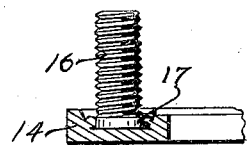
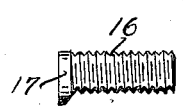
Inventor
Edward H. Ellison
By Clarence S. Walker
His Attorney Patented Oct. 20, 1931

1,827,884

UNITED STATES PATENT OFFICE

EDWARD H. ELLISON, OF JAMESTOWN, NEW YORK

METHOD FOR FASTENING ARTICLES TOGETHER

Application filed December 18, 1929. Serial No. 414,918.

This invention relates to an improved method and means of joining two metal members together, and more particularly to a means by which to conceal from view such joinder.

In its preferred embodiment this invention is directed to the method of joining metal screws to a metal plate in a manner such that the screw head is firmly anchored in said plate, being wholly concealed from view as well.

Prior to this invention, the practise has been to drill openings in a plate, insert rivets in the openings, and, after mounting said plate, head over the rivet ends. Because the rivets are of different composition from the plate in which they are fitted, they react differently to the air. Consequently, within a short time the rivet heads are of a different color from the plate and are most apparent. Furthermore, plates mounted through the use of rivets tend to become loosened thereby requiring the removal of the old rivets and insertion of new ones.

Another method of providing fastening means on a plate has been to produce lugs which, when formed with threads, may be made to support the plate. This practise is objectionable for the reason that lugs, formed from the same composition as the plate, are brittle and break off during manufacture or installation. Often a cracked lug will not be noticed during installation and subsequently the plate will give way as the lug breaks completely off.

The principal object of this invention is not only to avoid the above pointed out objections but to provide a metal plate with mounting means wholly concealed from the face of the plate.

Another object of this invention is to provide plate supporting means which, being formed from a more malleable composition than that of the plate, is of sufficient strength to support said plate throughout its usefulness.

A further object of this invention is to join mounting screws to a metal plate in an absolutely rigid and non-removable manner.

Other and further objects of the invention will appear from a consideration of the following specification when taken in conjunction with the accompanying drawings, and in which Fig. 1 is a plan view of one modification of this invention;

Fig. 2 is a transverse sectional view showing the metal plate formed with recesses and illustrating the first step of this process;

Fig. 3 is a transverse sectional view showing screws mounted in the recesses of the metal plate and this constiutes the second step in the process;

Fig. 4 is a fragmentary sectional view showing the metal rim of the recess in engagement with and supporting the head of the screw mounted thereon and this forms the last step in the process; and Figs. 5 and 6 are side and end views of the screw which is mounted on the plate.

Referring to the drawings, Figure 1 shows one particular embodiment of this invention in the form of a label or card holder 10 having the usual opening 11. The flanged edge 12, which extends through one of the side walls 13, permits insertion or removal of a card when the holder is mounted for use upon a drawer or other receptacle.

Centrally of the end walls 14, annular recesses 15 are formed which are in depth approximately two-thirds the thickness of the card holder 10. Mounted in the recess 15 are screws 16 having flat heads 17. As shown in Figure 6 of the drawing, the head 17 is formed with a flat edge 18. The recess 15 is of a diameter sufficient to freely engage the head 17 of the screw, which is of a thickness approximately one-half the depth of the recess. When the screws are in place (see Figure 3), the walls 19, which constitute the rim of the recess, are spun down into close engagement with the screw 16. The recess wall, adjacent the flat portion 18 of the screw head, fills in the space 20 in the recess 15 adjacent said head and prevents turning or twisting of the screw.

It has been found in practical use that to mount a malleable screw upon a cast or stamped plate, in the manner above described, provides a plate with a wholly adequate supporting means. For instance, there is no possibility of the screw turning by reason of the flat side 18 of the head of the screw. Furthermore, the screws themselves being malleable products, may be considerably abused by twisting or bending without giving way. Should the openings in the wall, to which the plate is secured, be slightly off center from the screws, it is not necessary to redrill or enlarge one of the openings since the screws may be slightly bent to overcome the inaccuracy. This method of providing securing means for a plate of this type not only creates a permanent mounting therefore but is highly economical from the manufacturing standpoint, particularly so in view of the fact that during manufacture the percentage of mutilated or broken screws is considerably less than when the screws are formed from lugs integral with the plate.

It may readily be understood that in producing and mounting a plate of this type less time is consumed than is required to produce and mount a plate held in place through the use of rivets.

While only one modification and one application of this invention has been shown and described, applicant is not limited thereto since it is obvious that other embodiments can be made without departing from the spirit and scope of the invention as set forth in the hereunto annexed claims.

Having thus set forth my invention what I claim as new and for which I desire protection by Letters Patent is:

1. The method of permanently joining a metal screw to a plate, consisting in first, forming an annular recess in one face of said plate; second, flattening one side of the head of said screw; third, inserting said screw in said recess; and fourth, spinning down the edges of said recess into engagement with the head of said screw.

2. The method of permanently joining a metal screw to a plate, consisting in first, forming an annular recess in one face of said plate; second, flattening one side of the head of said screw; third, inserting said screw in said recess; and fourth, spinning down the edges of said recess into engagement with the head of said screw and also to occupy the space adjacent the flat side of said screw head.

In testimony whereof I have affixed my signature.

EDWARD H. ELLISON.